United States Patent [19]

Boggs et al.

[11] Patent Number: 4,734,934
[45] Date of Patent: Mar. 29, 1988

[54] BINAURAL TELECONFERENCING SYSTEM

[75] Inventors: George J. Boggs, Weston; John F. Egan, Chelmsford, both of Mass.

[73] Assignee: GTE Laboratories Incorporated, Waltham, Mass.

[21] Appl. No.: 934,077

[22] Filed: Nov. 24, 1986

[51] Int. Cl.$^4$ .............................................. H04M 3/56
[52] U.S. Cl. .................................... 379/202; 379/206
[58] Field of Search .................. 379/53, 54, 158, 202, 379/203, 204, 205, 206; 370/62

[56] References Cited

U.S. PATENT DOCUMENTS 4,650,929 3/1987 Boerger et al. ........................ 358/86

Primary Examiner—Thomas W. Brown
Attorney, Agent, or Firm—Fred Fisher

[57] ABSTRACT

A teleconferencing bridge simulates the auditory spatial ambience of a face-to-face conference. This bridge uses a novel binaural approach to simulate spatial ambience.

16 Claims, 4 Drawing Figures (sheet 1 of 2)

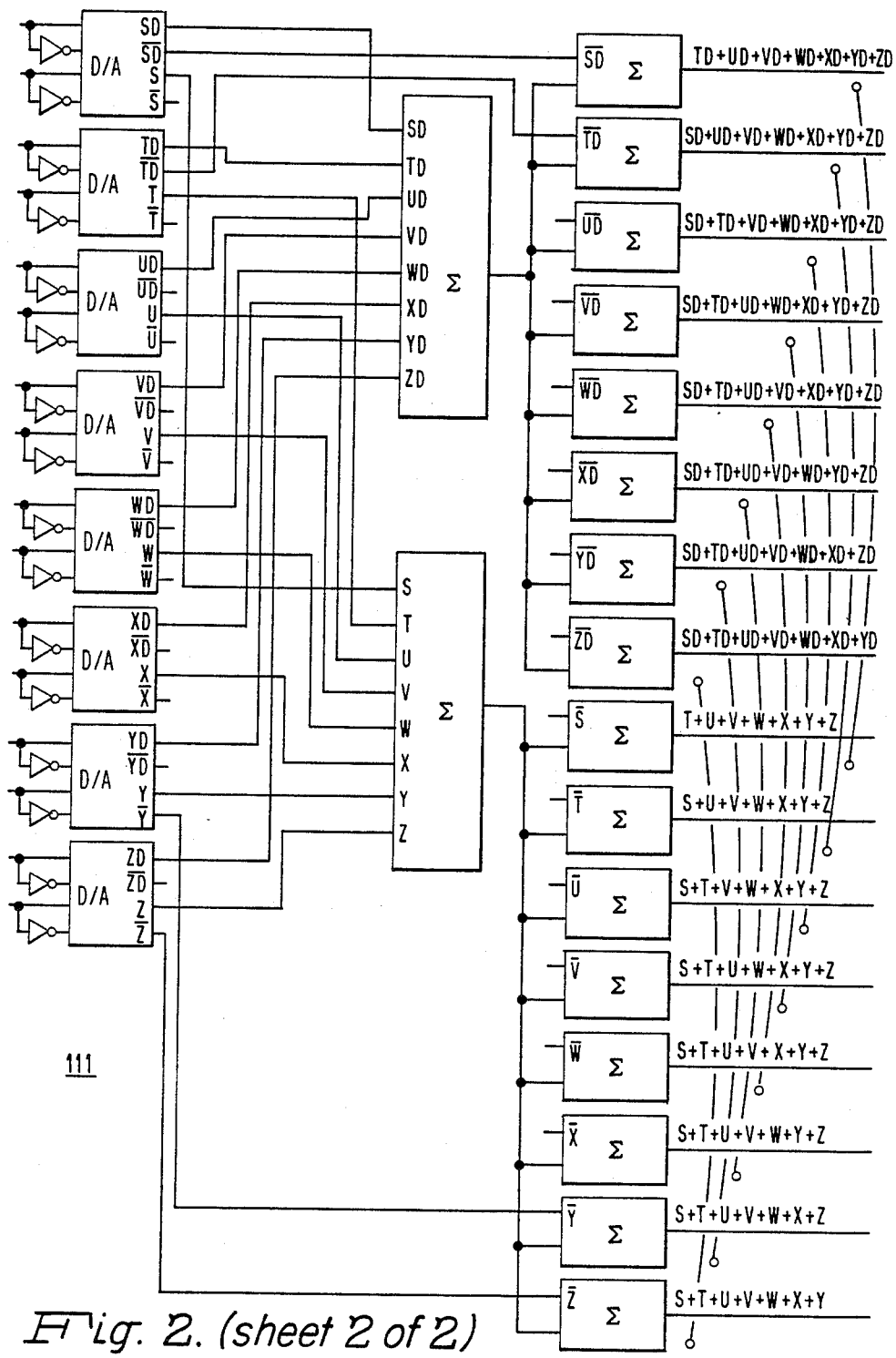
Fig. 2. (sheet 2 of 2)

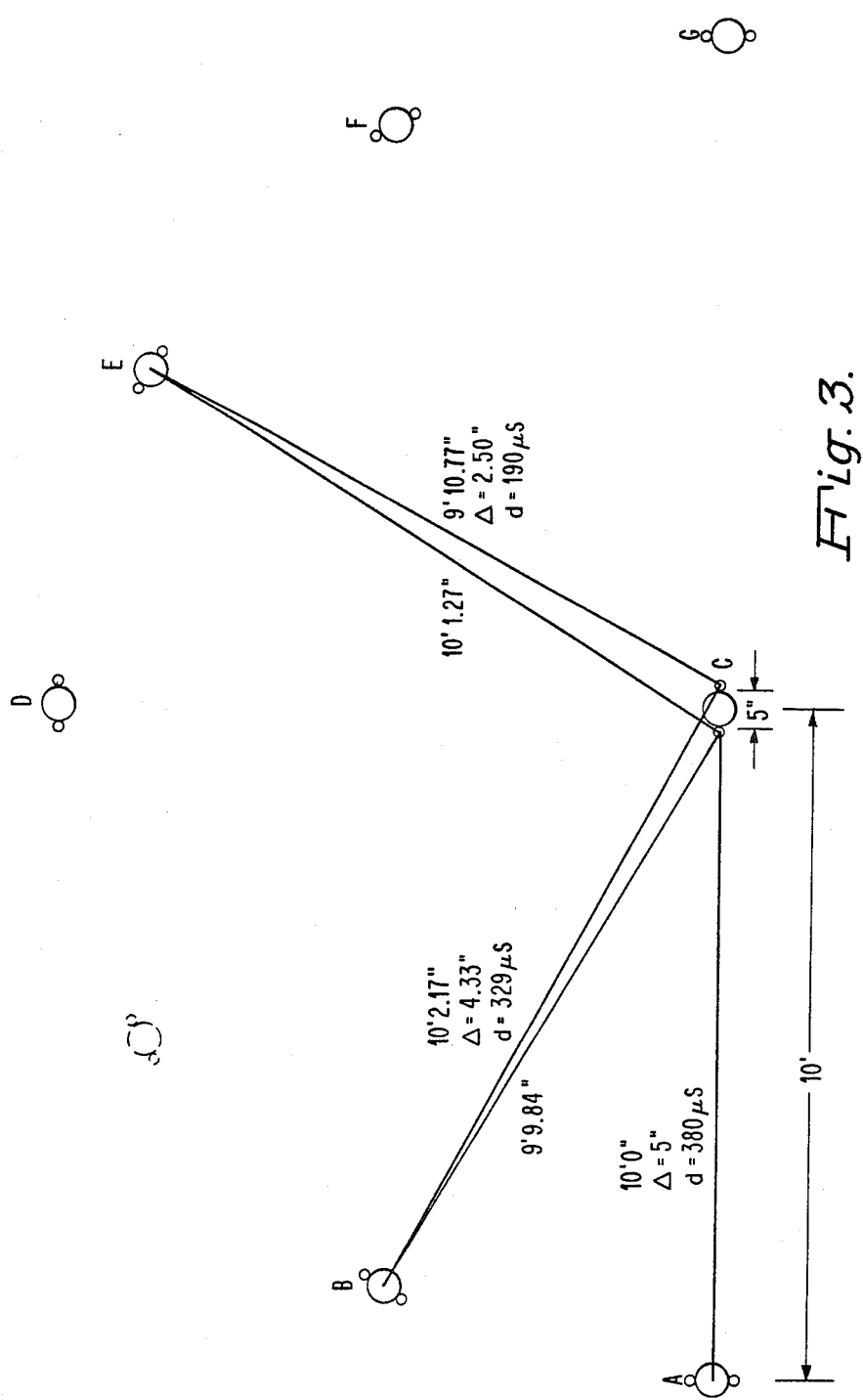

BINAURAL TELECONFERENCING SYSTEM

BACKGROUND OF THE INVENTION

1. Field of the Invention

This invention relates to methods of and apparatus for conducting binaural teleconferences and, in particular, to a teleconferencing bridge that simulates the auditory spatial ambience of a face-to-face conference. Accordingly, it is a general object of this invention to provide new and improved apparatus, methods, and bridges of such character.

2. General Background

Voice teleconferences, in the prior art, were conducted using monaural methods. The disadvantages of monaural teleconferencing are twofold: First, monaural teleconferencing does not permit simultaneous talking without loss of intelligibility. This is particularly true when simultaneous voices are acoustically similar. Second, it was often difficult to identify the speaker during a voice teleconference on the basis of monaural voice acoustic parameters alone.

The binaural voice teleconferencing bridge, as described herein, solves both of the foregoing problems. Binaural hearing is responsible for the "cocktail party effect". This effect permits a listener to selectively attend to a single talker in a milieu of several potentially interfering conversations. Therefore, simultaneous talking is not a problem with binaural teleconferencing. Also, psychological research has shown that speakers are much more readily identified when their spatial location is known. Speaker identifiability, in the prior art, was significantly reduced with monaural voice teleconferencing.

SUMMARY OF THE INVENTION

Another object of this invention is to provide for a new and improved binaural teleconferencing system in which the single channel speech path from a teleconference participant is divided into two speech paths, the speech along one of the paths being delayed with respect to the other path so that when the two paths are applied to a headset of another conferee, the teleconference participant appears to be specifically, spatially oriented.

Still another object of this invention is to provide for a new and improved binaural conferencing system in which a conferee, when attending a teleconference, wearing a stereophonic headset, senses that other conferees are spatially dispersed about a semicircle.

In accordance with one aspect of this invention, a teleconferencing system provides binaural discrimination for each of n conferees, where n is an integer greater than two. The invention includes, separately, amplifying speech from each of the conferees; then, the amplified speech of a first conferee is provided along a first path. The amplified speech of the first conferee, delayed a time duration $t_1$, is provided along a second path. The amplified speech of the second conferee is provided along a third path. The amplified speech of the second conferee, delayed a time duration $t_2$, is provided along a fourth path. The amplified speech of the third conferee is provided along a fifth path. The amplified speech of the third conferee, delayed a time duration $t_3$, is provided along a sixth path. The provided amplified speech from one of the first and the second paths, and from one of the third and the fourth paths, and from one of the fifth and the sixth paths are combined into a first combination. The provided amplified speech from the other of the first and the second paths, from the other of the third and the fourth paths, and from the other of the fifth and sixth paths are combined into a second combination. The amplified speech of the one of the first and the second paths from the first combination are suppressed, and the resulting suppressed combination is directed along a first line to the first conferee. The amplified speech of the other of the first and second paths from the second combination are suppressed, and the resulting suppressed combination is directed along a second line to the first conferee. The amplified speech of the one of the third and fourth paths from the first combination are suppressed, and that resulting suppressed combination is directed along a third line to the second conferee. The amplified speech of the other of the third and the fourth paths from the second combination are suppressed and the resulting suppressed combination is directed along a fourth line to the second conferee. The amplified speech of the one of the fifth and the sixth paths from the first combination are suppressed and that resulting suppressed combination is directed along a fifth line to the third conferee. The amplified speech of the other of the fifth and the sixth paths from the second combination are suppressed and the resulting suppressed combination is directed along a sixth line to the third conferee.

In accordance with certain features of the invention, the time duration is $t_1$, $t_2$ and $t_3$ can be varied. The amplified speech along the first, the third, and the fifth paths can be substantially undelayed. The teleconferencing system can include methods of and means for switching speech between the first and the second paths, and between the third and the fourth paths, and between the fifth and the sixth paths. Any one or more of $t_1$, $t_2$ or $t_3$ can be effectively positive or negative, whereby the actual values of $t_1$, $t_2$ and $t_3$ are such that $t_1$ is not equal to $t_2$ is not equal to $t_3$. The teleconferencing system can utilize analog to digital systems so that digital speech can be subsequently delayed and it can further include digital to analog converting apparatus for transmission to the respective conferees; n can be equal to an integer ranging from three to a maximum of, preferably, eight.

BRIEF DESCRIPTION OF THE DRAWING

Other objects, advantages, and features of this invention, together with its construction and mode of operation, will become more apparent from the following description, when read in conjunction with the accompany drawing, in which:

FIG. 3 is a diagram illustrating seven conferees acoustically oriented about a semicircle, a radius ten feet from one of the conferees.

DESCRIPTION OF PREFERRED EMBODIMENT(S)

Figure 1:
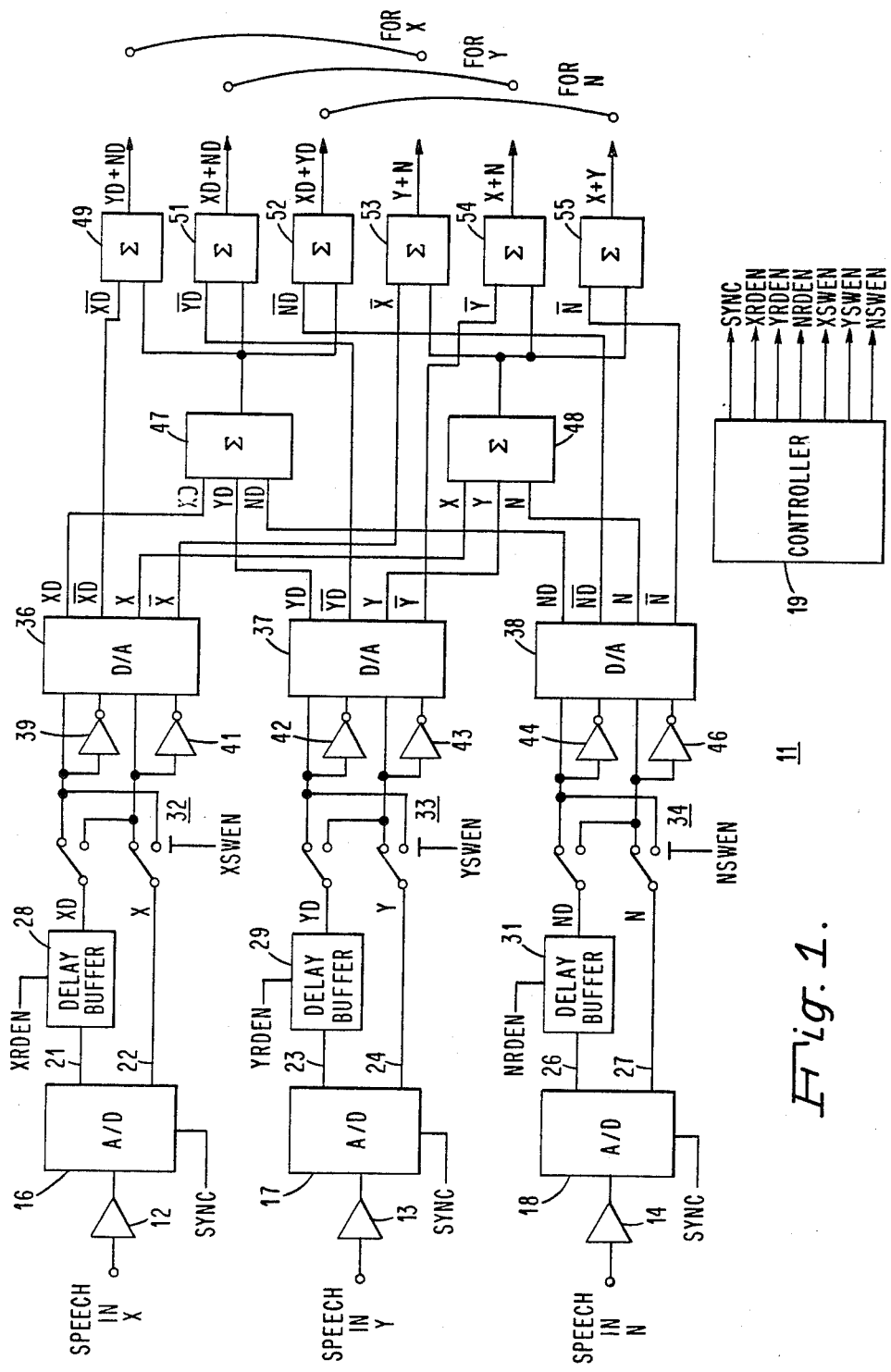
FIG. 1 is a block diagram of one embodiment of the invention for users X, Y and N.

The teleconferencing apparatus 11, as shown in FIG. 1, is a digital bridge that divides the single channel speech from a teleconference participant into two speech paths. Although the system design depicted and discussed herein employs digital components, the system can easily be realized with analog components at a somewhat greater cost and loss in reliability.

The speech from conferees X, Y and N, as depicted in FIG. 1, are amplified by amplifiers 12, 13, 14 for the conferees X, Y and N, respectively. The output of the amplifiers 12, 13, 14 are coupled, respectively, to analog to digital converters 16, 17, 18, which analog to digital converters receive synchronization pulses from a controller 19. The analog to digital converters 16, 17, 18, digitize the speech, providing digital signals onto two output lines 21, 22 for a conferee X, onto two output lines 23, 24 for conferee Y, and onto two output lines 26, 27 for conferee N.

The output line 21 is delayed a fixed time period by way of a delay buffer 28, which in practice can be buffering in a dedicated random access memory. The length of time a buffered sample resides in the random access memory is determined by the master microprocessor or controller 19. Similarly, speech from the conferee Y, provided via the analog to digital converter 17 on the line 23, is coupled to a delay buffer 29. Also, the speech from the conferee N, that is digitalized by the analog to digital converter 18 on the line 26, is provided to the delay buffer 31. The delay buffers 29, 31, similar to delay buffer 28, can be buffered in the dedicated random access memory and the length of time can be determined by the controller 19. The signal stored in the delay buffer 28 can be read out by an appropriate read enable signal XRDEN. The delay buffer 29 can be read out by the appropriate read enable signal YRDEN. Likewise, the delay buffer 31 can be read out by the appropriate read enable signal NRDEN.

The output of the delay buffer 28 and the signal on the line 22 are coupled to the arms of an electrically controlled double-pole double-throw switch 32. In similar fashion, the output of the delay buffer 29 and the signal on the line 24 are coupled to the arms of a double-pole double-throw switch 33. Similarly, the output of the delay buffer 31 and the signal on the line 27 are coupled to the arms of an electrically controlled double-pole double throw-switch 34. The double-pole double-throw switches are controlled by appropriate switch enabling signals XSWEN, YSWEN, and NSWEN, respectively, which were provided by the master microprocessor or controller 19. The cross-over switches 32, 33, 34 are capable of reversing the channel paths after the various delays, thereby enabling the bridge 11 to arbitrarily delay either channel.

As indicated earlier, the switches 32, 33, 34 are reversing switches. The wiring connections are so oriented, that input signals applied to the reversing switches 32, 33, 34, when the arms are in one orientation, directly convey the input signals onto a pair of output lines. When the switches 32, 33, 34 are switched in the other orientation, the input signals appear on the output lines in a reversed order.

The delayed signal and the direct signal are coupled to digital to analog converters 36, 37, 38. The output of the delay buffer 28 can be inverted through an inverter 39 and and its output is applied to the digital to analog converter 36. The signal on the line 22 is applied to the input of an inverter 41 whose output is coupled to the digital to analog converter 36. Similarly, the output of the buffer 29 and the output of the line 24 are applied through inverters 42, 43 to the digital to analog converter 37. Likewise, the output of the delay buffer 31 and the signal on the line 27 are coupled through inverters 44, 46 to the digital to analog converter 38.

Signals on a line from each conferee from the digital to analog converters 36, 37, 38, are added together by a summation device 47. The other outputs of the digital to analog converters are coupled to a summation device 48. Thus, in the embodiment depicted, the inputs applied to the summation device 47 are XD, YD, and ND which are received from the outputs of the digital to analog converters 36, 37, 38, respectively. Similarly, the summation device 48 has signals X, Y, and N applied thereto from the digital to analog converters 36, 37, 38, respectively. Thus, the two outputs per conferee are added to the corresponding channels of the other conferees and prepared for transmission. The outputs of the summation device 47 are applied to three summation devices 49, 51, 52, whereas the output of the summation device 48 is coupled to inputs of three summation devices 53, 54, 55. An inverted signal from each conferee, from the digital to analog converters 36, 37, 38, respectively, is added back to the conferee's return signal to cancel the conferee's own speech, thereby eliminating echo and delayed auditory feedback.

As indicated earlier, the new features of this invention are the provision and the use of two voice channels, one delayed relative to the other to simulate binaural auditory space.

Figure 2:
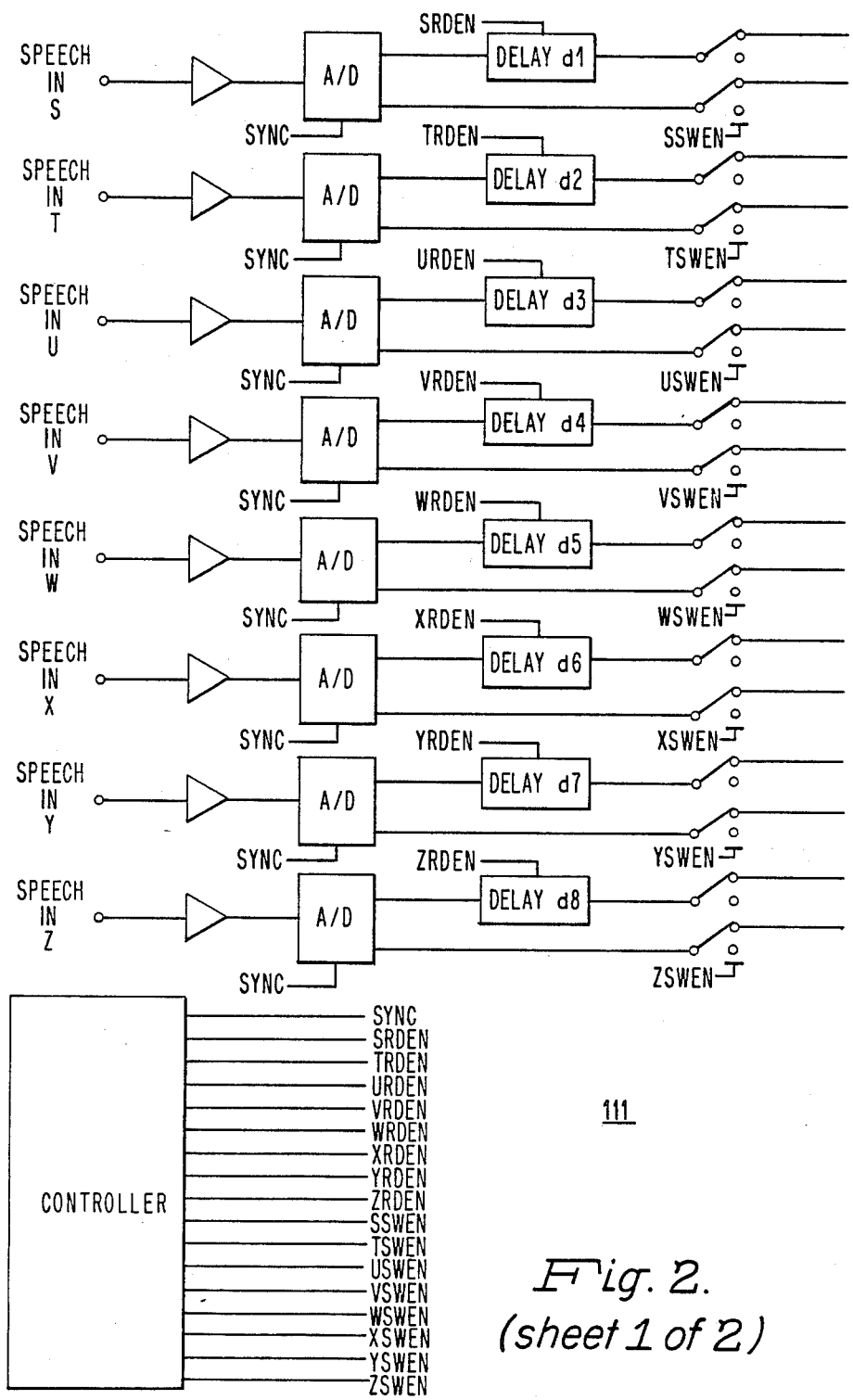
FIG. 2, consisting of one sheet labeled FIG. 2 (sheet 1 of 2) and another sheet labeled 2 (sheet 2 of 2.) is a block diagram of an embodiment of the invention for eight users.

Referring to FIG. 2, there is depicted a circuit diagram for eight conferees. The teleconferencing apparatus 111 therein depicted includes similar devices to that shown in FIG. 1 except that eight units are disclosed for eight conferees. Note that the outputs of the summation devices 112, 122 are directed to conferee S. The outputs can be applied to a pair of loudspeakers, either in a headset or freestanding (not shown). Similarly, the outputs of the summation devices 113, 123 are directed to the speaker T who has his inputs coupled to a respective pair of headset loudspeakers or the like. Likewise, the outputs of the summation devices 114, 124 are directed to the speaker U. The outputs of the summation devices 116, 126 are directed to the speaker V. The outputs of the summation devices 117, 127 are directed to the speaker W. The outputs of the summation devices 118, 128 are directed to the speaker X. The outputs of the summation devices 119, 129 are directed to the speaker Y, and, likewise, the outputs of the summation devices 121, 131 are coupled to the speaker or conferee Z.

The delays d1, d2, d3, d4, d5, d6, d7, d8 should be so adjusted to give to the appropriate conferee the illusion that the remaining conferees are spatially displaced around the listener. For example, as depicted in FIG. 3, assume a speaker C is attending a teleconference with conferees A, B, D, E, F, G. The duration of the time delays are so oriented that one gets the impression that the conferees are displaced about an arc of a semicircle.

As depicted in FIG. 3, C is depicted looking forward. Conferee A is depicted directly to the left 10 feet from the conferee C. Assuming a headwidth of 5 inches, sound from conferee A will reach the right ear of conferee C 380 microseconds after receipt of the sound by his left ear.

Assuming that conferee B is oriented 30° clockwise from conferee A, 10 feet from conferee C, then sound from conferee B travels 9 feet, 9.84 inches to the left ear of conferee C, while it travels 10 feet, 2.17 inches to the right ear of conferee C for a difference of 4.33 inches. Thus, sound to the right ear of conferee C is received 329 microseconds after the sound is received by the left ear of conferee C. With regard to 60° clockwise displacement from conferee A, conferee C does not appear to sense anyone in that location, since his own speech (as to conferee C) has been suppressed.

Conferee C receives sound from conferee D simultaneously in both ears, giving the impression that conferee D is directly in front of him.

Conferee E is made to appear (from an auditory viewpoint) 30° to the right of center from conferee C's viewpoint. Assuming that conferee E is displaced 30° to the right of center, 10 feet away from conferee C, sound from conferee E travels a distance of 10 feet, 1.27 inches to the left ear of conferee C while it traverses a distance of 9 feet, 10.77 inches to the right ear of conferee C, creating a difference of 2.50 inches. The difference of time is such that the sound from conferee E is received by conferee C in his right ear 190 microseconds sooner than the sound in his left ear.

It is noted that the various delays around the illusiory arc are sinusoidally distinctive. Progressing clockwise, the delay from the left would be 380 microseconds; at 30° clockwise from the left, the delay would 329 microseconds; 30° further clockwise (60° from conferee A) the delay would be 190 microseconds; from straight ahead it would be zero delay; 30° further clockwise, the delay (in a sense) would be $-190$ microseconds; 30° further the delay would be $-329$ microseconds; and 30° further, presenting a conferee G directly to the right of the conferee C, the delay would be $-380$ microseconds. A "positive" delay gives the illusion to conferee C that the talking conferee is to one side of center; a "negative" delay creates the illusion (to conferee C) that the talking conferee is on the other side of center.

In conclusion, the invention resides in the fact that various conferees, three or more, can talk into the respective microphones; each speech is amplified and the signals broadly are combined together. Signals for each speaker, also, are delayed different amounts and the signals are combined together; two loudspeakers in a headset are provided for each of the conferees. One of the earphones generally is in current real time and the other is delayed. The respective delays of the various conferees are different. The signals for each conferee is cancelled from his respective headset. The result is that each particular conferee hears in one ear, current real time for the remaining conferees and the other ear hears delayed speech from the other conferees, each conferee being delayed a different amount, the different amount being on the neighborhood of at least 100 millionth of a second. As just immediately described, it would appear that the various conferees are at only one side of the listener. Preferably, the switches should be so oriented that conferees appear both to the left and to the right. This is achieved by the various switch enabling circuits so that generally for half the conferees, the sound for the left ear is delayed, and for the other half of the conferees sound for the right ear is delayed.

Digitalizing the circuitry is preferable because of cost and also be cause it fits well into digital networking architecture.

Various modifications may be performed without departing from the spirit and scope of the invention. For example, sound directed into one ear and not the other for various conferees may be variably attenuated to reinforce the illusion of a spatial orientation of the various conferees.

What is claimed is:

1. Teleconferencing apparatus for providing binaural discrimination for each of n conferees, where n is an integer greater than two, comprising
   means for amplifying speech from a first of said conferees,
   means for amplifying speech from a second of said conferees,
   means for amplifying speech from a third of said conferees,
   means for providing the amplified speech of said first conferee along a first path,
   means for providing the amplified speech of said first conferee, delayed a time duration $t_1$, along a second path,
   means for providing the amplified speech of said second conferee along a third path,
   means for providing the amplified speech of said second conferee, delayed a time duration $t_2$, along a fourth path,
   means for providing the amplified speech of said third conferee along a fifth path,
   means for providing the amplified speech of said third conferee, delayed a time duration $t_3$, along a sixth path,
   means for combining the provided amplified speech from one of said first and said second paths, from one of said third and said fourth paths, and from one of said fifth and said sixth paths, into a first combination,
   means for combining the provided amplified speech from the other of said first and said second paths, from the other of said third and said fourth paths, and from the other of said fifth and said sixth paths, into a second combination,
   means for suppressing the amplified speech of said one of said first and said second paths from said first combination, and directing the resulting suppressed combination along a first line to said first conferee,
   means for suppressing the amplified speech of said other of said first and said second paths from said second combination, and directing the resulting suppressed combination along a second line to said first conferee,
   means for suppressing the amplified speech of said one of said third and said fourth paths from said first combination, and directing the resulting suppressed combination along a third line to said second conferee,
   means for suppressing the amplified speech of said other of said third and said fourth paths from said second combination, and directing the resulting suppressed combination along a fourth line to said second conferee,
   means for suppressing the amplified speech of said one of said fifth and said sixth paths from said first combination, and directing the resulting suppressed combination along a fifth line to said third conferee, and
   means for suppressing the amplified speech of said other of said fifth and said sixth paths from said second combination, and directing the resulting suppressed combination along a sixth line to said third conferee.

2. The teleconferencing apparatus as recited in claim 1 further including means for varying said time durations $t_1$, $t_2$, and $t_3$.

3. The teleconferencing apparatus as recited in claim 1 wherein the amplified speech along said first, said third, and said fifth paths are substantially undelayed.

4. The teleconferencing apparatus as recited in claim 1 further comprising first switching means for switching speech on said first and said second paths,
second switching means for switching speech on said third and said fourth paths, and
third switching means for switching speech on said fifth and said sixth paths.

5. The teleconferencing apparatus as recited in claim 4 wherein any one or more of $t_1$, $t_2$, or $t_3$ can be effectively positive or negative, and whereby the actual values of $t_1$, $t_2$ and $t_3$ are such that $t_1 \neq t_2 \neq t_3$.

6. The teleconferencing apparatus as recited in claim 1 further comprising analog to digital converting means so that digital speech can be subsequently delayed, and digital to analog converting means.

7. The teleconferencing apparatus as recited in claim 1 wherein n is equal to three.

8. The teleconferencing apparatus as recited in claim 1 wherein n is equal to seven.

9. A method of teleconferencing with binaural discrimination for each of n conferees, where n is an integer greater than two, comprising the steps of
amplifying speech from a first of said conferees,
amplifying speech from a second of said conferees,
amplifying speech from a third of said conferees,
providing the amplified speech of said first conferee along a first path,
providing the amplified speech of said first conferee, delayed a time duration $t_1$, along a second path,
providing the amplified speech of said second conferee along a third path,
providing the amplified speech of said second conferee, delayed a time duration $t_2$, along a fourth path,
providing the amplified speech of said third conferee along a fifth path,
providing the amplified speech of said third conferee, delayed a time duration $t_3$, along a sixth path,
combining the provided amplified speech from one of said first and said second paths, from one of said third and said fourth paths, and from one of said fifth and said sixth paths, into a first combination,
combining the provided amplified speech from the other of said first and said second paths, from the other of said third and said fourth paths, and from the other of said fifth and said sixth paths, into second combination,
suppressing the amplified speech of said one of said first and said second paths from said first combination, and directing the resulting suppressed combination along a first line to said first conferee,
suppressing the amplified speech of said other of said first and said second paths from said second combination, and directing the resulting suppressed combination along a second line to said first conferee,
suppressing the amplified speech of said one of said third and said fourth paths from said first combination, and directing the resulting suppressed combination along a third line to said second conferee,
suppressing the amplified speech of said other of said third and said fourth paths from said second combination, and directing the resulting suppressed combination along a fourth line to said second conferee,
suppressing the amplified speech of said one of said fifth and said sixth paths from said first combination, and directing the resulting suppressed combination along a fifth line to said third conferee, and
suppressing the amplified speech of said other of said fifth and said sixth paths from said second combination, and directing the resulting suppressed combination along a sixth line to said third conferee.

10. The method as recited in claim 9 further including the steps of varying said time durations $t_1$, $t_2$ and $t_3$.

11. The method as recited in claim 9 wherein the amplified speech along said first, said third, and said fifth paths are substantially undelayed.

12. The method as recited in claim 9 further including the steps of
switching speech on said first and said second paths,
switching speech on said third and said fourth paths, and
switching speech on said fifth and said sixth paths.

13. The method as recited in claim 12 wherein any one or more of $t_1$, $t_2$, or $t_3$ can be effectively positive or negative, and whereby the actual values of $t_1$, $t_2$, and $t_3$ are such that $t_1 \neq t_2 \neq t_3$.

14. The method as recited in claim 9 further including the steps of converting analog speech into digital data,
transmitting said digital data along a first course,
delaying different portions of said digital data different time delays along a second course, and
converting the digital data along both said courses into analog signals.

15. The method as recited in claim 9 wherein n is equal to three.

16. The method as recited in claim 9 where n is equal to seven.

* * * * *